UNITED STATES PATENT OFFICE.

DANIEL BROBST, OF PORTLAND, MICHIGAN.

ROOF-PAINT COMPOSITION.

SPECIFICATION forming part of Letters Patent No. 315,471, dated April 14, 1885.

Application filed February 13, 1884. (No specimens.)

*To all whom it may concern:*

Be it known that I, DANIEL BROBST, a citizen of the United States, residing at Portland, in the county of Ionia and State of Michigan, have invented a new and useful Painting Composition, of which the following is a specification.

My invention relates to an improved composition for roofing-paints and paints of this character to be used for the preservation of different articles; and it has for its object to produce at a slight cost a paint which shall possess superior advantages in point of durability and general efficiency.

The composition consists of the following ingredients, combined in about the proportions as follows: coal-tar, twelve gallons; asphalt, four gallons; salt, six pounds; alum, four pounds; gypsum, eight pounds; Roman cement, eight pounds; sulphur, five pounds; pine-resin, five pounds; benzine, one-half gallon; slaked lime, two gallons; tallow, two pounds; copperas, one pound.

In preparing the above composition the slaked lime is placed in a suitable receptacle and the scum removed. The tallow and copperas are then added. The coal-tar is boiled and the asphalt added, which is reduced to a liquid form. The lime, tallow, and copperas, which have been previously prepared, are then added. The other parts are then added, and the composition is ready for use. In using the same, the roof is preferably covered with felt and the same coated with the composition, which is applied with a brush. Dry sharp sand is then sprinkled upon the roof and pressed into the felt with a roller. A second coat of the composition is then applied.

In using the above-described composition upon tin roofs or upon metal of any kind, the salt is omitted, as the tendency thereof is to rust the metal. The sand is also omitted when the composition is used upon metal.

I claim and desire to secure by Letters Patent—

The composition, substantially as herein described, consisting of coal-tar, asphalt, salt, alum, gypsum, Roman cement, sulphur, pine-resin, benzine, slaked lime, tallow, and copperas in about the proportions specified.

In testimony that I claim the foregoing as my own I have hereto affixed my signature in presence of two witnesses.

DANIEL BROBST.

Witnesses:
S. K. GATES,
W. H. HOWARD.